US012759677B2

(12) United States Patent
Huang et al.

(10) Patent No.: US 12,759,677 B2
(45) Date of Patent: Oct. 13, 2026

(54) BIONIC ANIMAL

(71) Applicant: Pioneer Material Precision Tech Co., Ltd., New Taipei City (TW)

(72) Inventors: Wei-Yu Huang, New Taipei City (TW); Li-Yuan Yeh, New Taipei City (TW); Ching-Hung Liu, New Taipei City (TW); Chang-Qi Zhang, New Taipei City (TW); Chih-Wei Shen, New Taipei City (TW)

(73) Assignee: Pioneer Material Precision Tech Co., Ltd., New Taipei City (TW)

( * ) Notice: Subject to any disclaimer, the term of this patent is extended or adjusted under 35 U.S.C. 154(b) by 166 days.

(21) Appl. No.: 18/977,971

(22) Filed: Dec. 12, 2024

(65) Prior Publication Data

US 2026/0070632 A1 Mar. 12, 2026

(30) Foreign Application Priority Data

Sep. 10, 2024 (CN) ........................ 202411259935.1
Sep. 10, 2024 (CN) ........................ 202422207417.7

(51) Int. Cl.

| | |
|---|---|
| ***B63B 35/00*** | (2020.01) |
| ***A01M 31/06*** | (2006.01) |
| ***A63H 11/00*** | (2006.01) |
| ***A63H 13/00*** | (2006.01) |
| ***A63H 13/02*** | (2006.01) |
| ***A63H 23/10*** | (2006.01) |
| ***B63H 5/16*** | (2006.01) |

(52) U.S. Cl.

CPC ............. *B63B 35/00* (2013.01); *A01M 31/06* (2013.01); *A63H 11/00* (2013.01); *A63H 13/005* (2013.01); *A63H 13/02* (2013.01); *A63H 23/10* (2013.01); *B63H 5/16* (2013.01)

(58) Field of Classification Search

CPC ......... A63H 23/10; A63H 11/00; A01M 31/06
See application file for complete search history.

(56) References Cited

U.S. PATENT DOCUMENTS 5,141,464 A * 8/1992 Stern ...................... A63H 13/02 446/353
6,926,580 B1 * 8/2005 Wang ..................... A63H 11/00 446/322

FOREIGN PATENT DOCUMENTS

| | | |
|---|---|---|
| EP | 2 070 571 B1 | 12/2011 |
| KR | 10-2066976 B1 | 2/2020 |
| TW | 465369 | 11/2001 |
| TW | M436488 U1 | 9/2012 |

(Continued)

*Primary Examiner* — Richard G Davis
(74) *Attorney, Agent, or Firm* — Winston Hsu

(57) ABSTRACT

A bionic animal includes a body, a head, a neck, a plurality of joint reels, a plurality of joint driving wires and a plurality of joint driving mechanisms. The neck includes a base, a plurality of first joints and a second joint. The base is disposed on the body. The first joints are pivotally connected to each other. The second joint is fixed to the head. The joint reels are disposed on the body. The joint driving wires are wound around the joint reels and connected to the first joints and the second joint. The joint driving mechanisms are disposed in the body and connected to the joint reels. The joint driving mechanisms drive the joint reels to rotate, the joint reels pull the joint driving wires, and the joint driving wires drive the first joints and the second joint to rotate.

12 Claims, 10 Drawing Sheets

(56) References Cited

FOREIGN PATENT DOCUMENTS

| | | | |
|---|---|---|---|
| TW | M628994 | U | 7/2022 |
| TW | I831712 | B | 2/2024 |
| TW | M663944 | U | 12/2024 |
| WO | 2024/180798 | A1 | 9/2024 |

* cited by examiner

BIONIC ANIMAL

BACKGROUND OF THE INVENTION

1. Field of the Invention

The invention relates to a bionic animal and, more particularly, to a bionic animal capable of being applied to a bionic waterfowl.

2. Description of the Prior Art

At present, a neck joint mechanism of a conventional bionic waterfowl uses a plurality of interconnected motors to control each joint. Since the distance between the joints needs to be at least equal to the length of a motor, the gap between the joints will become very large. Furthermore, the angle the joint can rotate is limited by the width of the motor. Moreover, the weight of the plurality of motors is too heavy, such that the overall center of gravity of the bionic waterfowl may be easily and significantly changed during the movements of head and neck, thereby causing the waterfowl to overturn. After the waterfowl overturns, the motors will also be damaged due to water exposure.

SUMMARY OF THE INVENTION

The invention provides a bionic animal capable of being applied to a bionic waterfowl, so as to solve the aforesaid problems.

According to an embodiment of the invention, a bionic animal comprises a body, a head, a neck, a plurality of joint reels, a plurality of joint driving wires and a plurality of joint driving mechanisms. The neck comprises a base, a plurality of first joints and a second joint. The base is disposed on the body. The plurality of first joints are pivotally connected to each other. The second joint is fixed to the head. One of the plurality of first joints is pivotally connected to the base. The second joint is pivotally connected to another one of the plurality of first joints. The plurality of joint reels are disposed on the body. The plurality of joint driving wires are wound around the plurality of joint reels and connected to the plurality of first joints and the second joint. The plurality of joint driving mechanisms are disposed in the body and connected to the plurality of joint reels. The plurality of joint driving mechanisms drive the plurality of joint reels to rotate, the plurality of joint reels pull the plurality of joint driving wires, and the plurality of joint driving wires drive the plurality of first joints and the second joint to rotate.

In an embodiment, each of the plurality of first joints is triangular.

In an embodiment, two extending portions extend from two sides of each of the plurality of first joints, and the joint driving wire is fixed to the two extending portions.

In an embodiment, two sides of each of the plurality of first joints have two inclined restraining surfaces, and a bottom of one of the plurality of first joints cooperates with the two inclined restraining surfaces of another one of the plurality of first joints to restrain a rotation angle of the first joint.

In an embodiment, each of the plurality of joint driving mechanisms comprises a joint motor, a coupling, a transmission shaft, an oil seal and a bearing, the coupling is connected to the joint motor, the transmission shaft is connected to the coupling and the joint reel, and the oil seal and the bearing are sleeved on the transmission shaft.

In an embodiment, the bionic animal further comprises a neck driving mechanism disposed in the body and connected to the base, wherein the neck driving mechanism drives the base to rotate to drive the head to rotate.

In an embodiment, the plurality of first joints and the second joint rotate around a first axis, the head rotates around a second axis, and the first axis is perpendicular to the second axis.

In an embodiment, the neck driving mechanism comprises a rotating shaft, a first gear, a second gear and a neck motor, the first gear is connected to the neck motor, the second gear meshes with the first gear, and the rotating shaft is connected to the second gear and the base.

In an embodiment, the bionic animal further comprises a buttock, a buttock reel, a buttock driving wire and a buttock driving mechanism. The buttock is pivotally connected to the body. The buttock reel is disposed on the body. The buttock driving wire is wound around the buttock reel and connected to the buttock. The buttock driving mechanism is disposed in the body and connected to the buttock reel. The buttock driving mechanism drives the buttock reel to rotate, the buttock reel pull the buttock driving wire, and the buttock driving wire drives the buttock to rotate.

In an embodiment, the bionic animal further comprises a propeller disposed in the buttock, wherein the buttock has an opening and at least one slot, and the propeller is exposed in the opening. When the propeller rotates in water, water flows into or out of the buttock through the at least one slot.

In an embodiment, the bionic animal further comprises two feet pivotally connected to two sides of the body, wherein the two feet are bent toward each other.

In an embodiment, the bionic animal further comprises three distance sensors disposed in the body, wherein positions of the three distance sensors correspond to front, left and right sides of the bionic animal respectively.

As mentioned in the above, the invention utilizes the joint reels, the joint driving wires and the joint driving mechanisms to drive the joints to rotate in a wire driving manner, such that the head and the neck can flexibly perform various actions (e.g. stretching forward, leaning back, raising the head, lowering the head, shaking the neck, etc.). The invention may use lightweight materials to manufacture small joints, such that the joints are closely connected to each other. Furthermore, the invention may also enable the bionic animal to move forward, backward, turn, accelerate, etc. in the water through the control of the buttock, the feet and/or the propeller. Since the motors of the joint driving mechanisms and the buttock driving mechanism are disposed in a waterproof space of the body, the motors will not be affected by moisture. Moreover, the motors disposed in the body can stabilize the overall center of gravity on the lower half of the bionic animal, such that the center of gravity can remain stable when the head and the neck move, without causing the bionic animal to overturn. In an embodiment, the positions of the three distance sensors correspond to front, left and right sides of the bionic animal respectively, such that the three distance sensors may be configured to detect obstacles in front, left and right of the bionic animal, thereby allowing the bionic animal to avoid obstacles.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
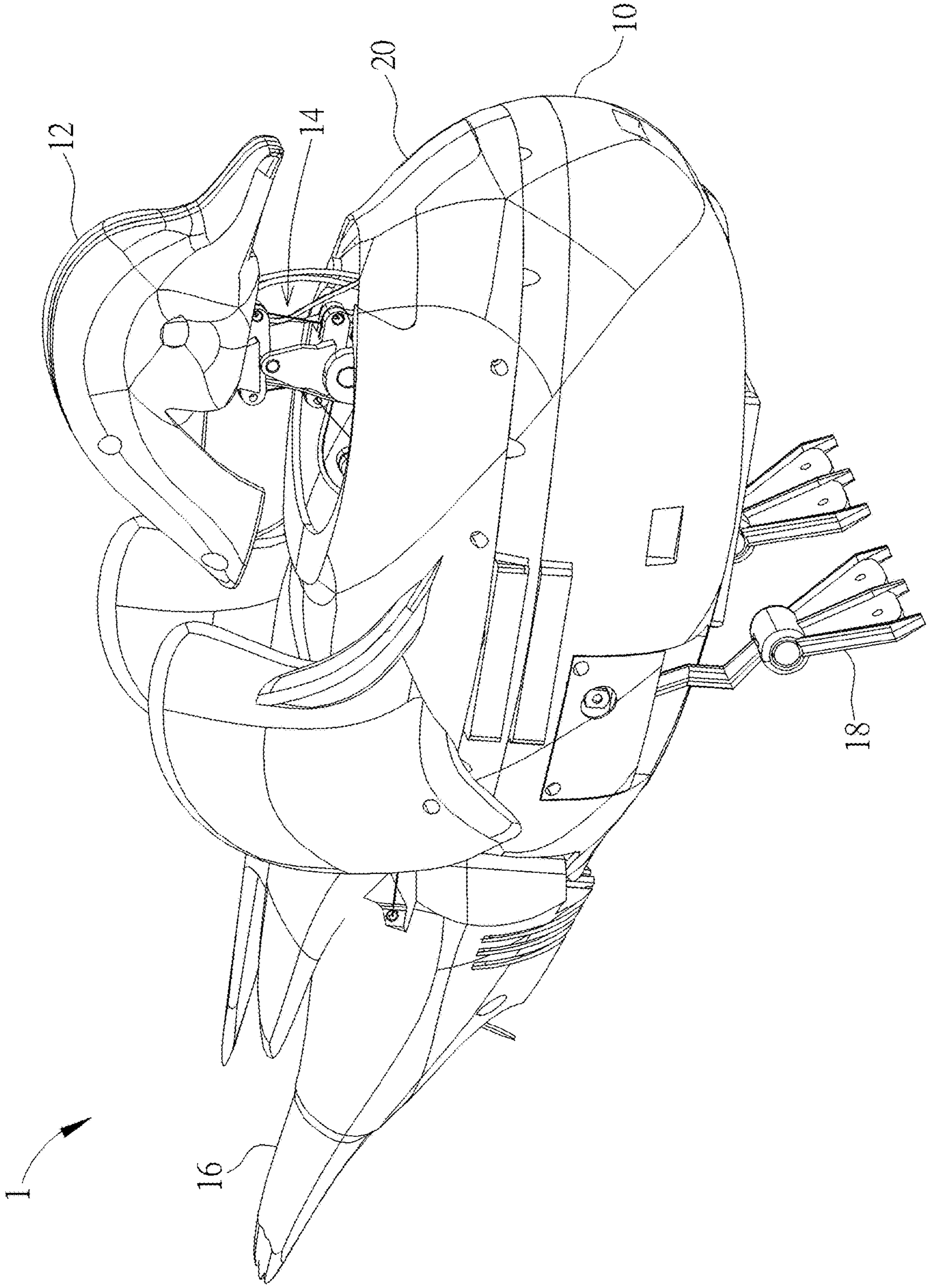
FIG. 1 is a perspective view illustrating a bionic animal according an embodiment of the invention.
Figure 2:
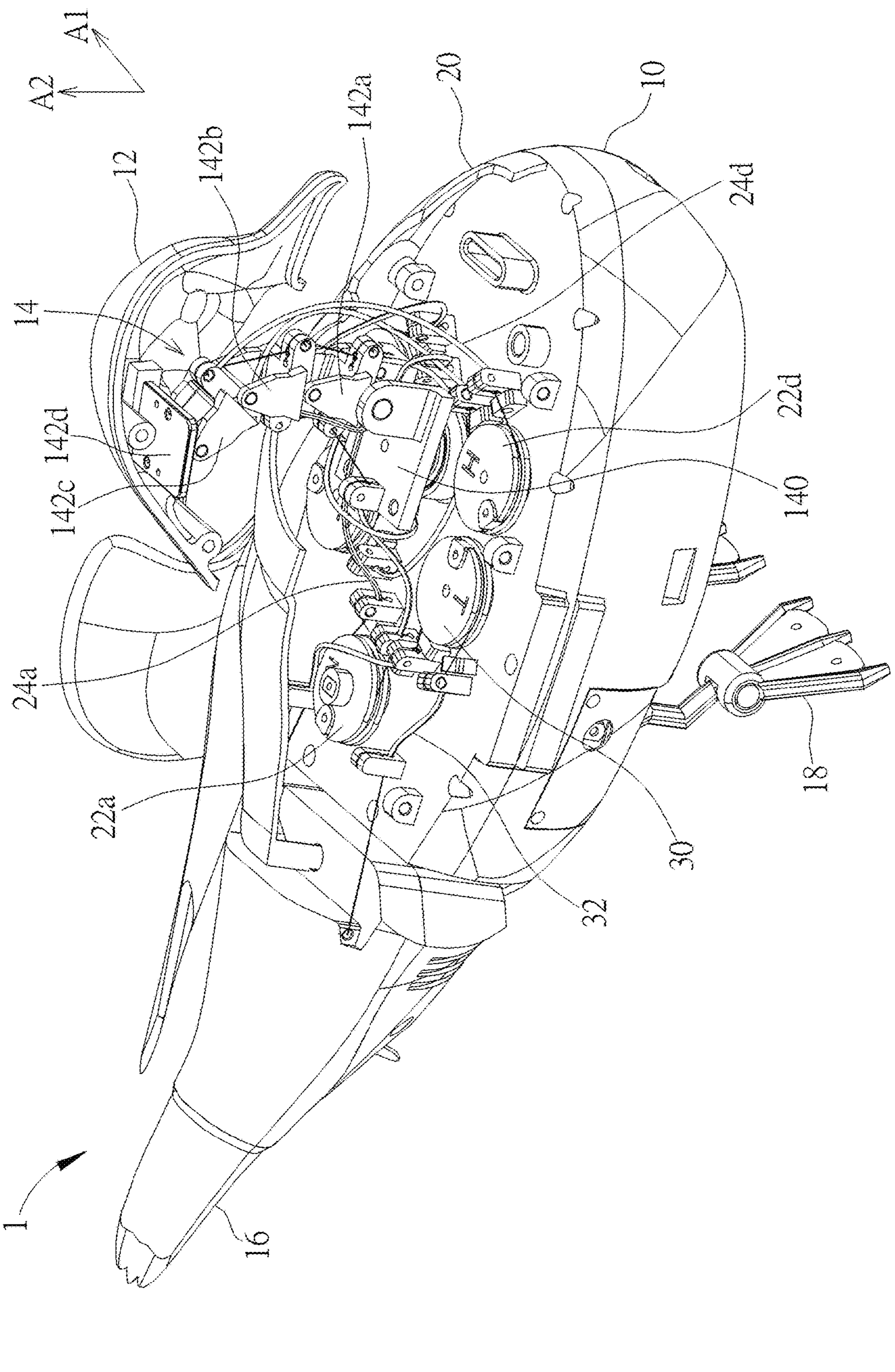
FIG. 2 is another perspective view illustrating the bionic animal shown in FIG. 1.
Figure 3:
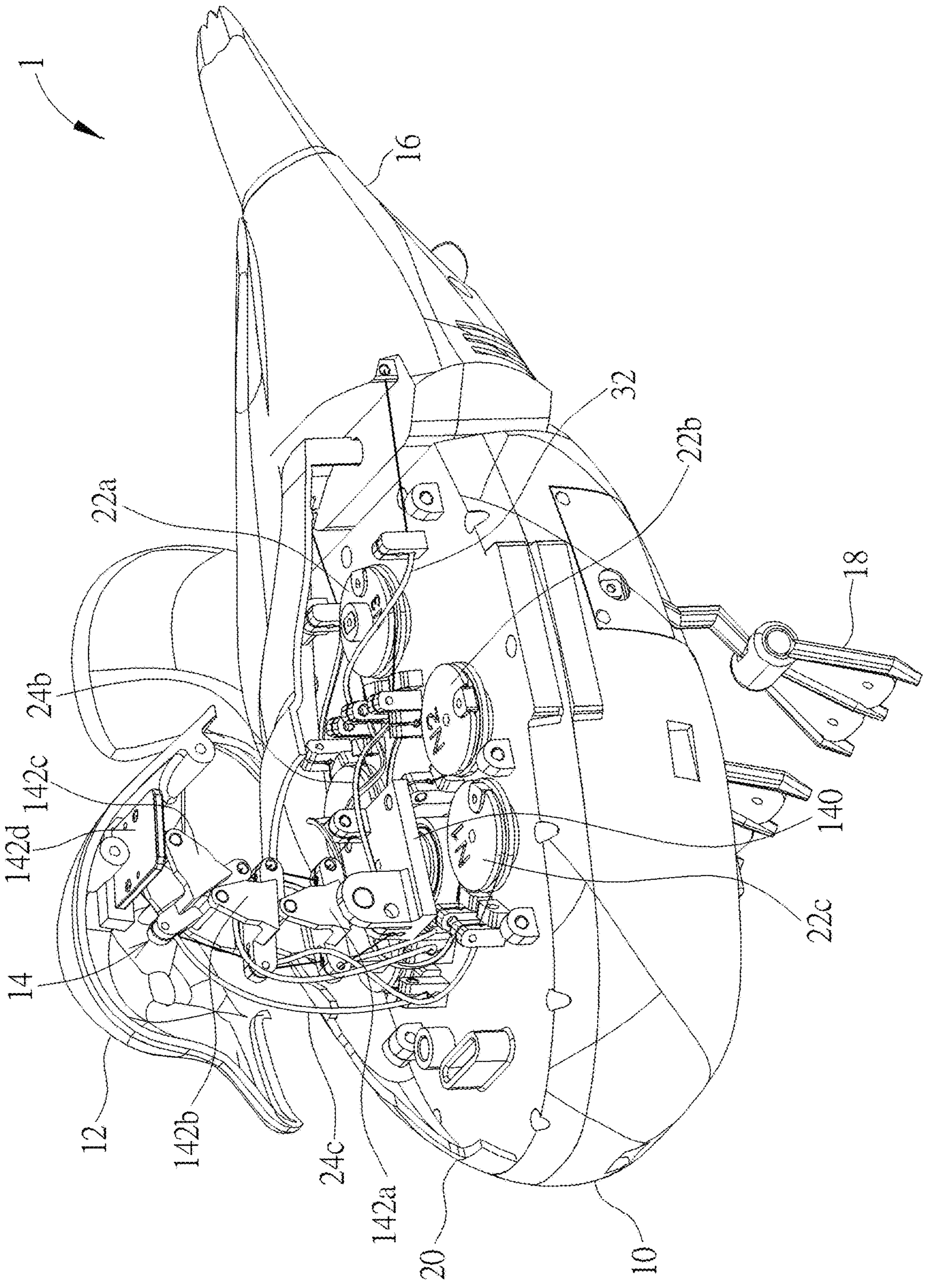
FIG. 3 is another perspective view illustrating the bionic animal shown in FIG. 1.
Figure 4:
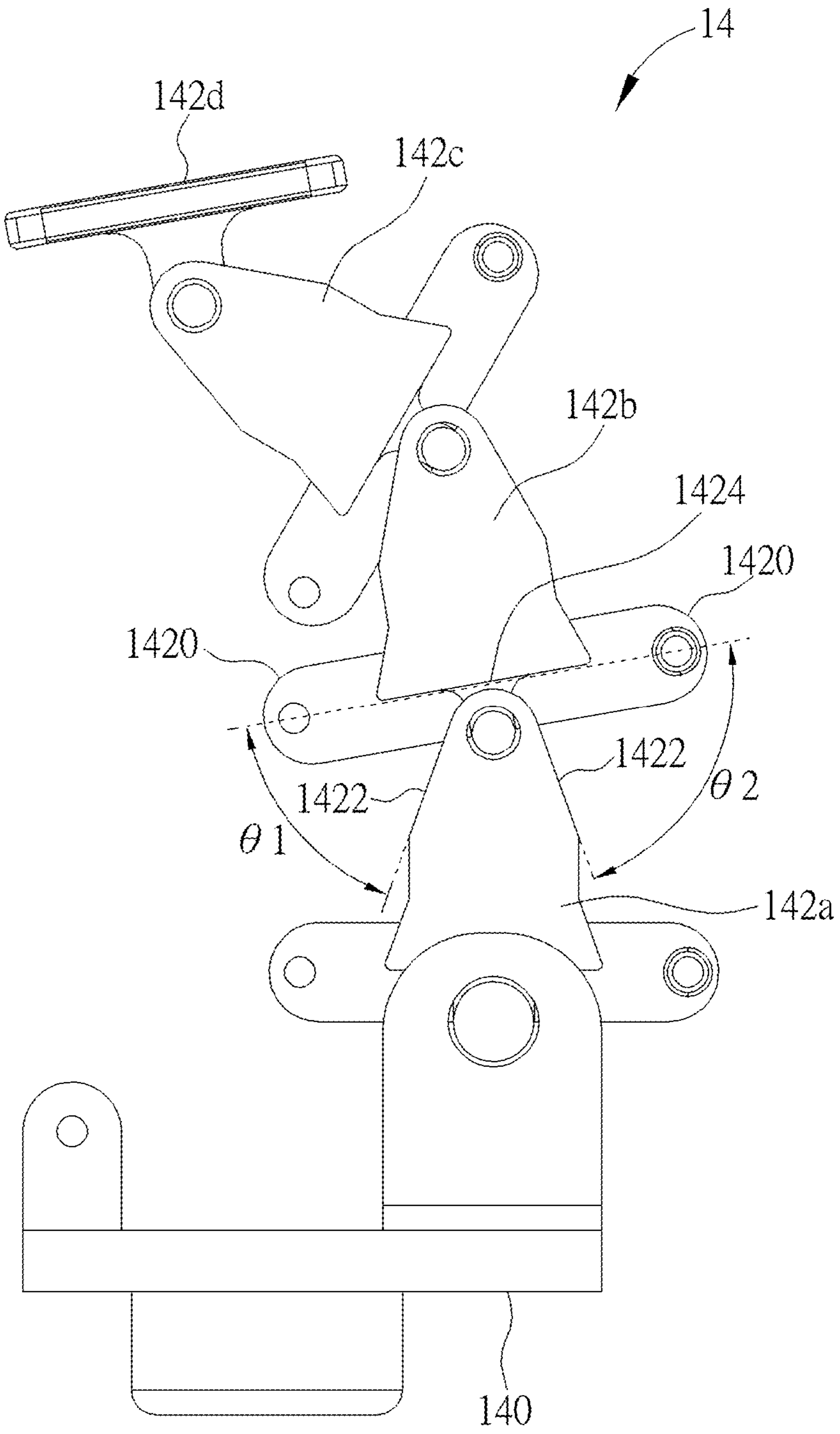
FIG. 4 is a side view illustrating a neck shown in FIG. 2.
Figure 5:
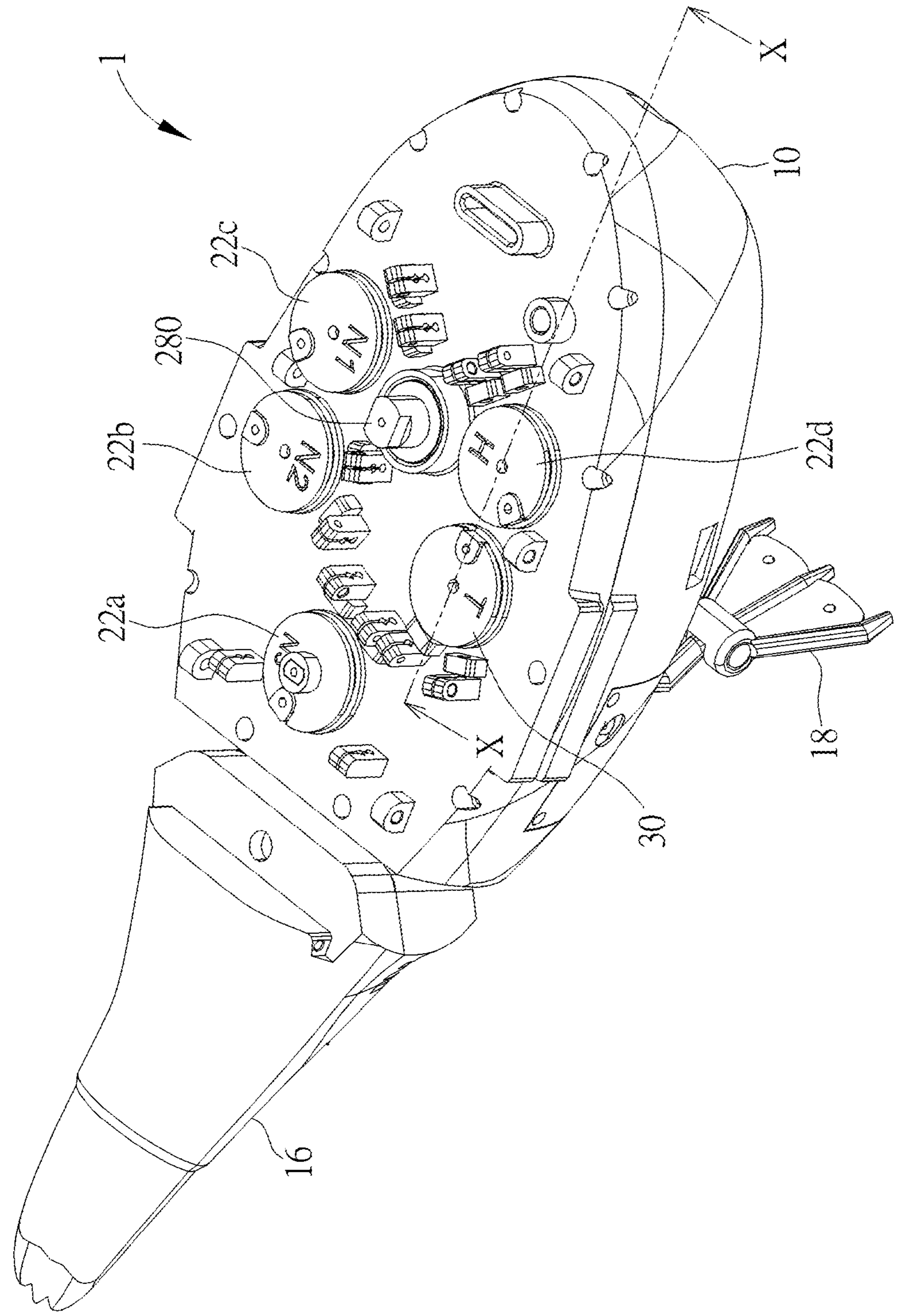
FIG. 5 is a partial perspective view illustrating the bionic animal shown in FIG. 1.
Figure 6:
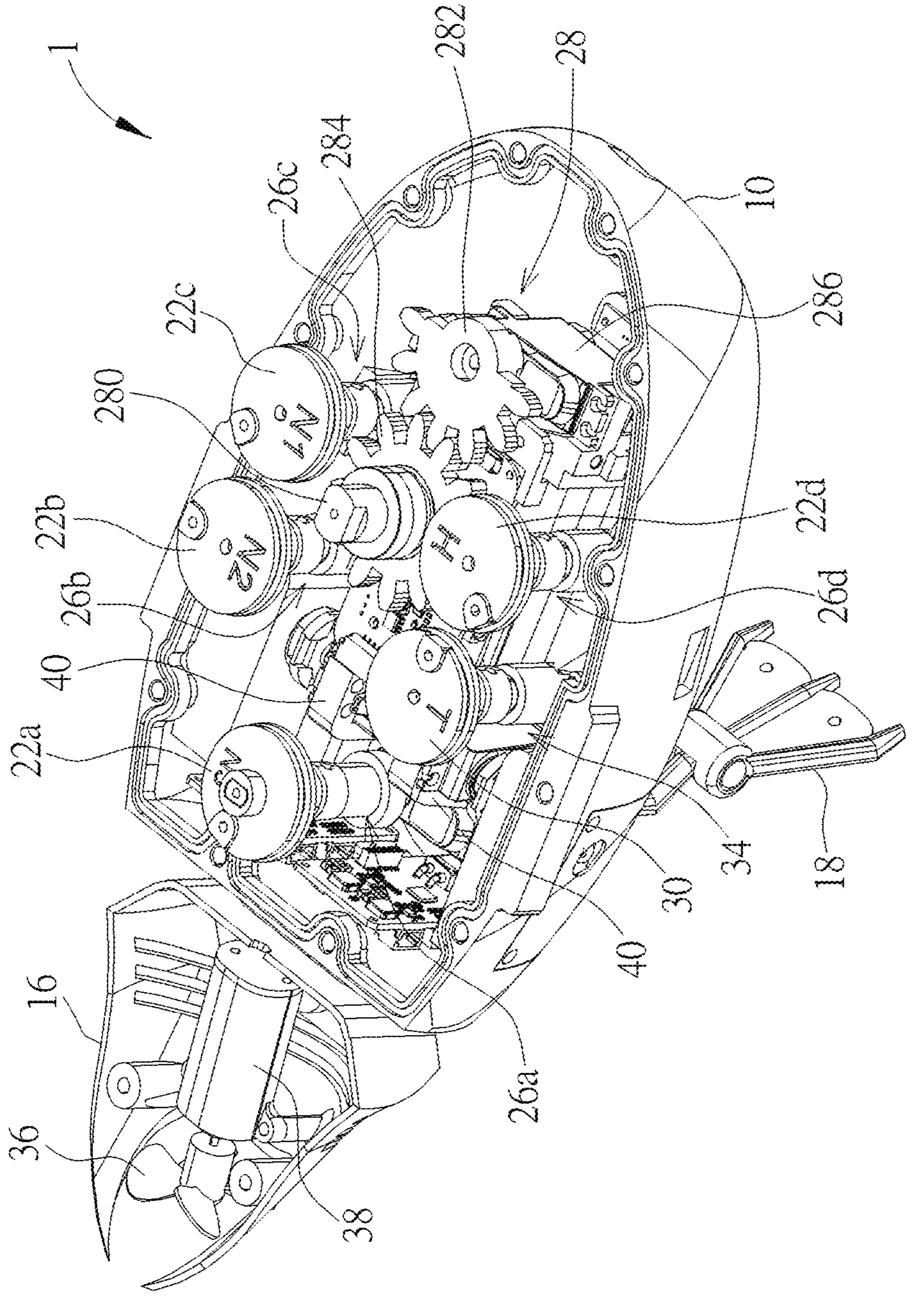
FIG. 6 is another partial perspective view illustrating the bionic animal shown in FIG. 1.
Figure 7:
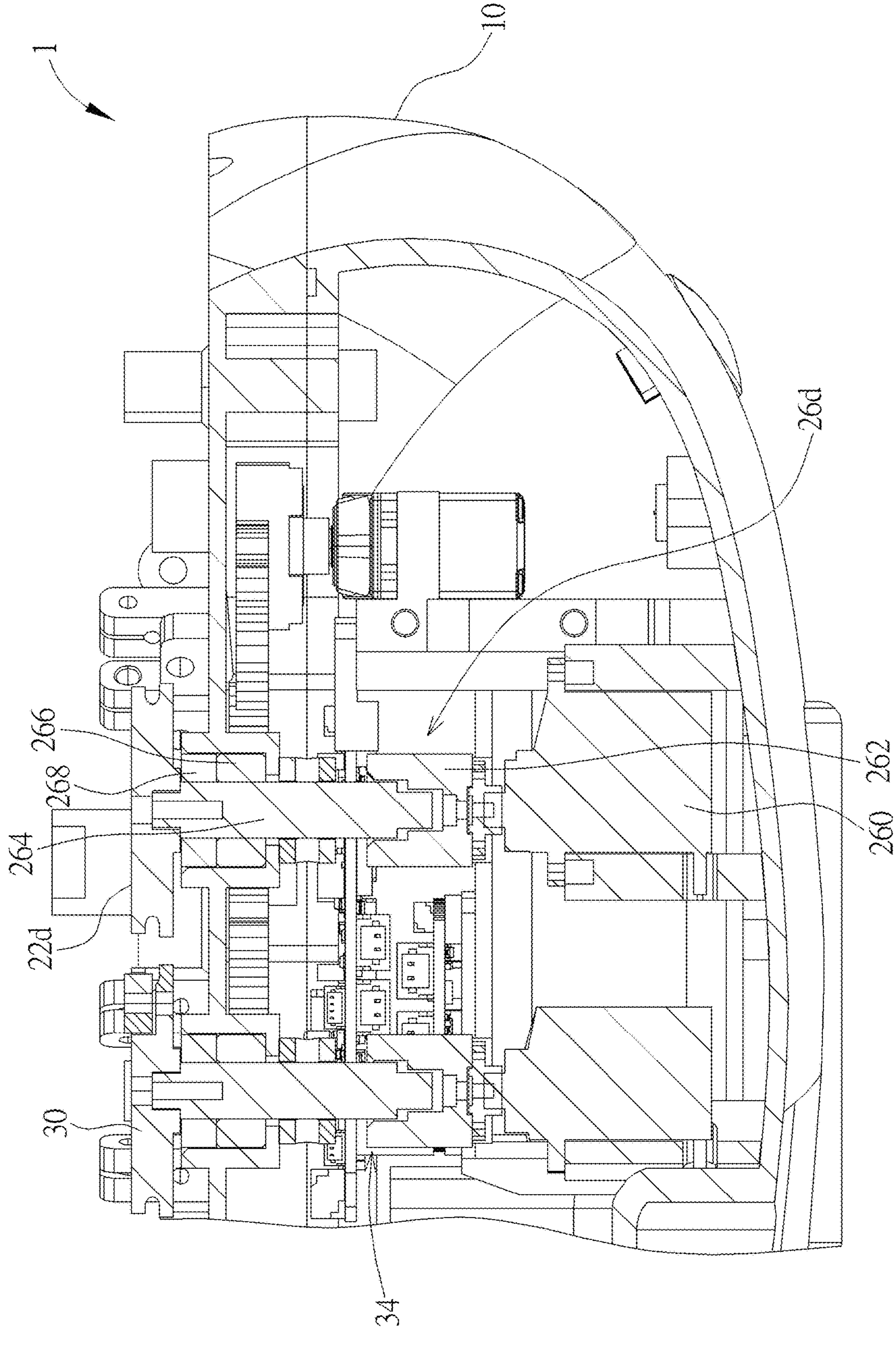
FIG. 7 is a partial sectional view illustrating the bionic animal shown in FIG. 5.
Figure 8:
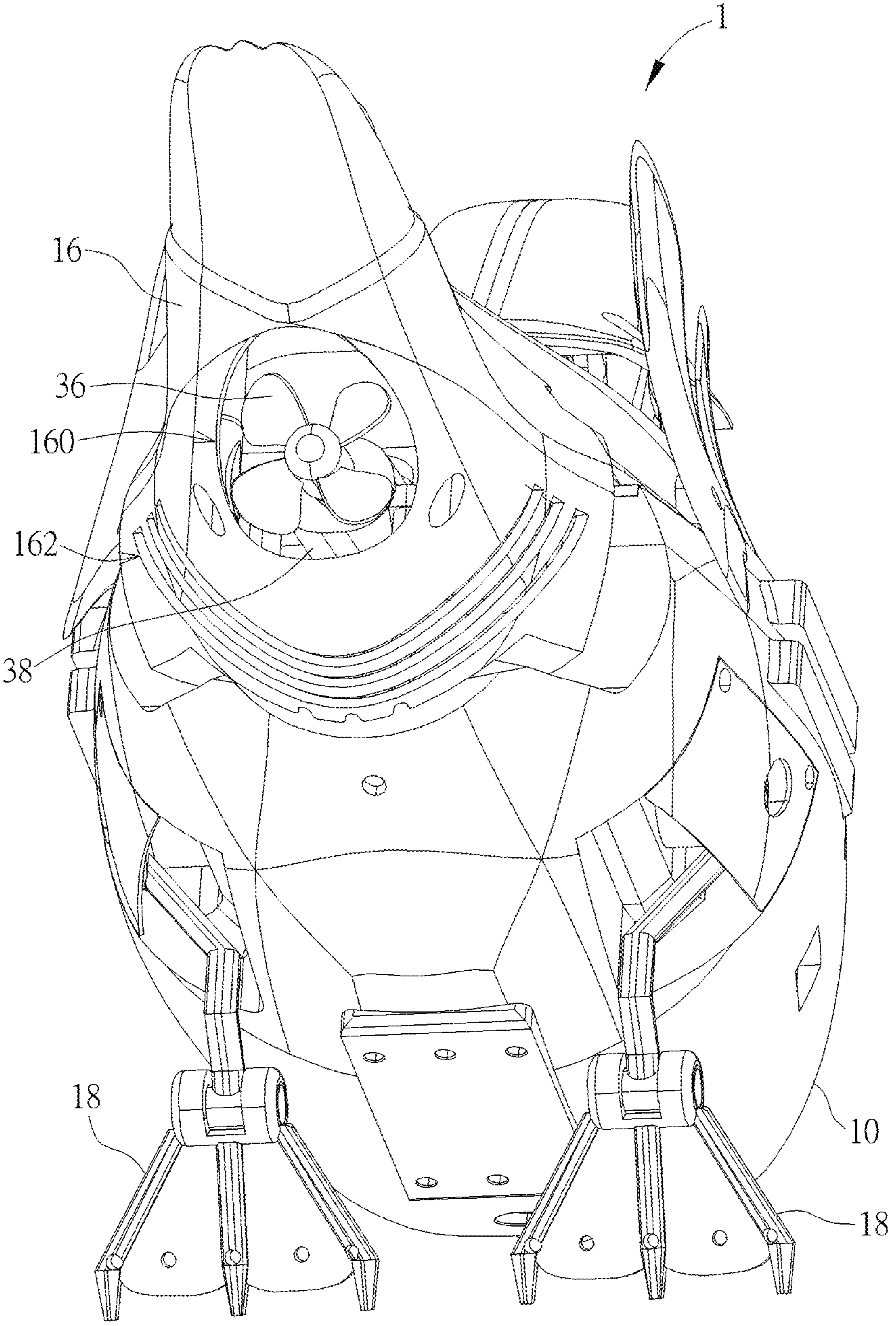
FIG. 8 is a perspective view illustrating the bionic animal shown in FIG. 1.
Figure 9:
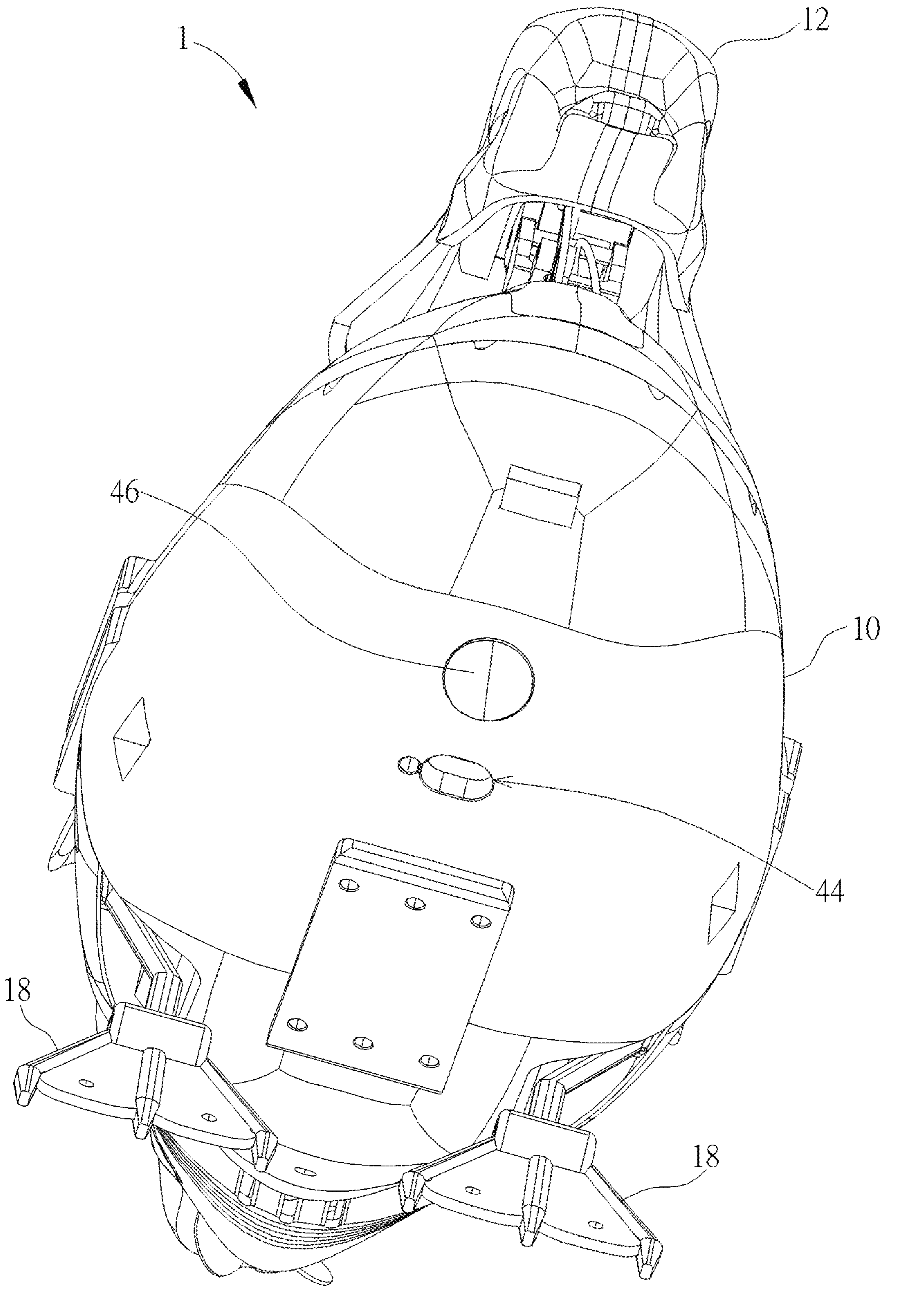
FIG. 9 is a perspective view illustrating the bionic animal shown in FIG. 1.
Figure 10:
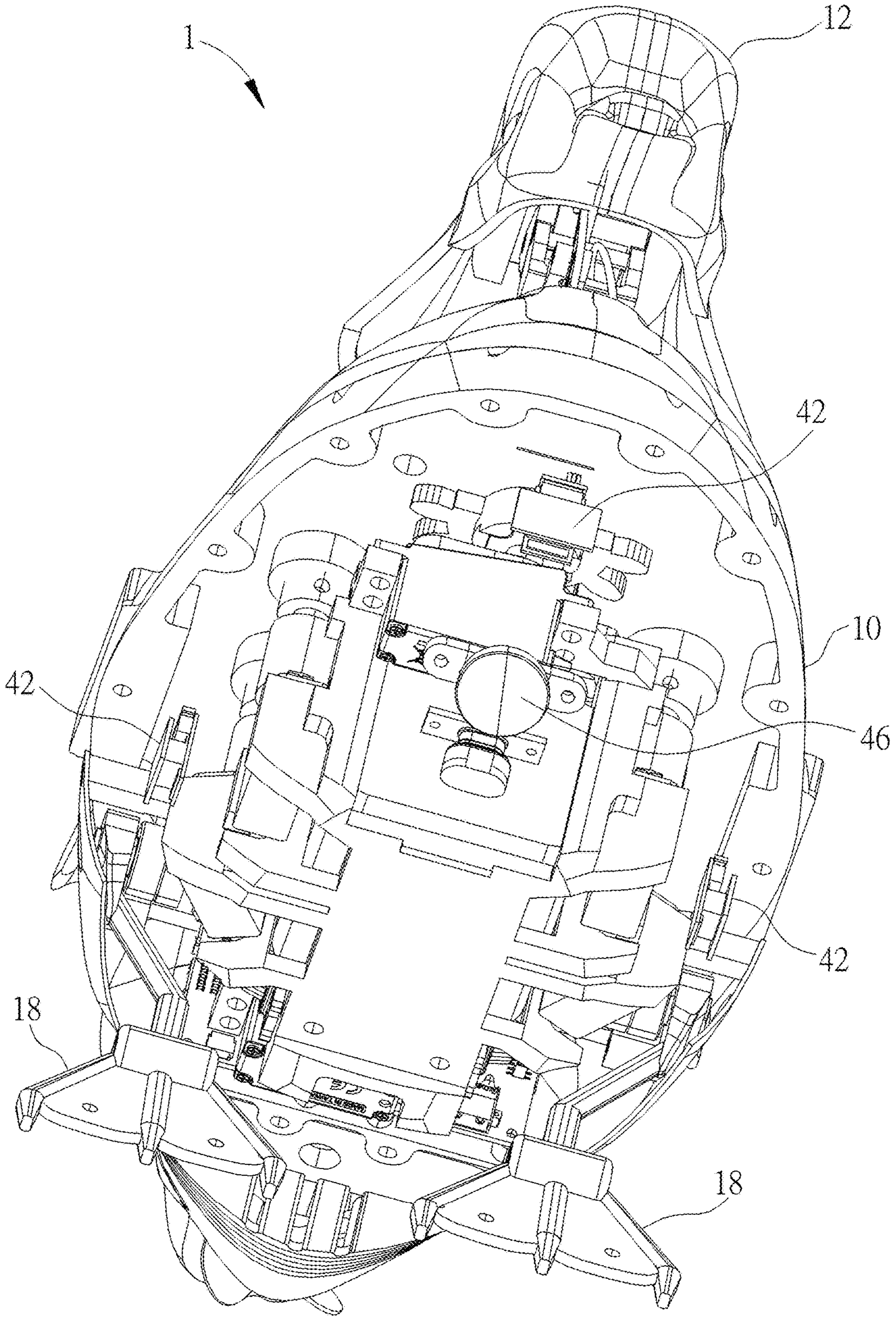
FIG. 10 is an inside view illustrating the bionic animal shown in FIG. 9.

Referring to FIGS. 1 to 10, FIG. 1 is a perspective view illustrating a bionic animal 1 according an embodiment of the invention, FIG. 2 is another perspective view illustrating the bionic animal 1 shown in FIG. 1, FIG. 3 is another perspective view illustrating the bionic animal 1 shown in FIG. 1, FIG. 4 is a side view illustrating a neck 14 shown in FIG. 2, FIG. 5 is a partial perspective view illustrating the bionic animal 1 shown in FIG. 1, FIG. 6 is another partial perspective view illustrating the bionic animal 1 shown in FIG. 1, FIG. 7 is a partial sectional view illustrating the bionic animal 1 shown in FIG. 5 along line X-X, FIG. 8 is a perspective view illustrating the bionic animal 1 shown in FIG. 1, FIG. 9 is a perspective view illustrating the bionic animal 1 shown in FIG. 1, and FIG. 10 is an inside view illustrating the bionic animal 1 shown in FIG. 9.

The bionic animal 1 of the invention may be, but is not limited to, a bionic waterfowl. The type of the bionic animal 1 may be determined according to practical applications. As shown in FIGS. 1 to 3, the bionic animal 1 comprises a body 10, a head 12, a neck 14, a buttock 16, two feet 18 and an outer cover 20. The body 10 is configured to accommodate the main mechanical components and electronic components of the bionic animal 1. The outer cover 20 is disposed on the body 10 for decoration. In this embodiment, the outer cover 20 may be in a shape of an upper half of a waterfowl with wings, but the invention is not so limited. The neck 14 is connected to the top of the body 10 and extends out of the outer cover 20. The head 12 is connected to the neck 14. The buttock 16 is connected to the rear of the body 10. The two feet 18 are connected to the bottom of the body 10. The head 12, the buttock 16 and the outer cover 20 may be designed with lightweight thin shells, such that the center of gravity of the bionic animal 1 may be stably maintained on the body 10 below, thereby preventing the bionic animal 1 from overturning while swimming on the water surface. The invention may provide a waterproof design for the body 10 to prevent the electronic components (e.g. motor, battery, circuit board, sensor, etc.) in the body 10 from being damaged by water.

As shown in FIGS. 2 to 4, the neck 14 comprises a base 140, a plurality of first joints 142*a*, 142*b*, 142*c* and a second joint 142*d*. The base 140 is disposed on the body 10. The plurality of first joints 142*a*, 142*b*, 142*c* are pivotally connected to each other. The second joint 142*d* is fixed to the head 12. One of the plurality of first joints 142*a*, 142*b*, 142*c* is pivotally connected to the base 140, and the second joint 142*d* is pivotally connected to another one of the plurality of first joints 142*a*, 142*b*, 142*c*. In this embodiment, the first joint 142*a* is pivotally connected to the base 140 and the second joint 142*d* is pivotally connected to the first joint 142*c*. It should be noted that the number of first joints may be determined according to practical applications, so the invention is not limited to the embodiment shown in the figure.

As shown in FIGS. 2, 3 and 5, the bionic animal 1 further comprises a plurality of joint reels 22*a*, 22*b*, 22*c*, 22*d*, a plurality of joint driving wires 24*a*, 24*b*, 24*c*, 24*d*, and a plurality of joint driving mechanisms 26*a*, 26*b*, 26*c*, 26*d*. The plurality of joint reels 22*a*, 22*b*, 22*c*, 22*d* are disposed on the body 10. The plurality of joint driving wires 24*a*, 24*b*, 24*c*, 24*d* are wound around the plurality of joint reels 22*a*, 22*b*, 22*c*, 22*d* and connected to the plurality of first joints 142*a*, 142*b*, 142*c* and the second joint 142*d*. In this embodiment, the joint driving wires 24*a*, 24*b*, 24*c* are respectively connected to the first joints 142*a*, 142*b*, 142*c*, and the joint driving wire 24*d* is connected to the second joint 142*d*. The plurality of joint driving mechanisms 26*a*, 26*b*, 26*c*, 26*d* are disposed in the body 10 and connected to the plurality of joint reels 22*a*, 22*b*, 22*c*, 22*d*.

In this embodiment, two extending portions 1420 may extend from two sides of each of the first joints 142*a*, 142*b*, 142*c*, such that each of the first joints 142*a*, 142*b*, 142*c* is triangular, as shown in FIG. 4. Two ends of each of the joint driving wires 24*a*, 24*b*, 24*c* may be fixed to the two extending portions 1420 of the corresponding first joints 142*a*, 142*b*, 142*c*. In this embodiment, fixing holes may be formed on the extending portions 1420 to fix the joint driving wires 24*a*, 24*b*, 24*c*. Similarly, fixing holes may be formed on the second joint 142*d* to fix the joint driving wire 24*d*.

The joint driving mechanisms 26*a*, 26*b*, 26*c*, 26*d* may drive the joint reels 22*a*, 22*b*, 22*c*, 22*d* to rotate. For example, when the joint driving mechanism 26*a* drives the joint reel 22*a* to rotate, the joint reel 22*a* will pull the joint driving wire 24*a*. At this time, the joint driving wire 24*a* will drive the first joint 142*a* to rotate. Similarly, when the joint driving mechanisms 26*b*, 26*c*, 26*d* drive the joint reels 22*b*, 22*c*, 22*d* to rotate, the joint reels 22*b*, 22*c*, 22*d* will pull the joint driving wires 24*b*, 24*c*, 24*d*. At this time, the joint driving wires 24*b*, 24*c*, 24*d* will drive the first joints 142*b*, 142*c* and the second joint 142*d* to rotate. For further explanation, when the joint driving mechanisms 26*a*, 26*b*, 26*c*, 26*d* drive the joint reels 22*a*, 22*b*, 22*c*, 22*d* to rotate clockwise or counterclockwise, the joint reels 22*a*, 22*b*, 22*c*, 22*d* may drive the joint driving wires 24*a*, 24*b*, 24*c*, 24*d* to retract and unfold, so as to drive the corresponding first joints 142*a*, 142*b*, 142*c* and second joint 142*d* to rotate clockwise or counterclockwise. Thus, the joint driving mechanisms 26*a*, 26*b*, 26*c*, 26*d* may drive the first joints 142*a*, 142*b*, 142*c* and the second joint 142*d* to rotate simultaneously or individually, such that the head 12 and the neck 14 can flexibly perform various actions (e.g. stretching forward, leaning back, raising the head, lowering the head, shaking the neck, etc.).

As shown in FIG. 4, two sides of each of the first joints 142*a*, 142*b*, 142*c* may have two inclined restraining surfaces 1422. Thus, a bottom 1424 of one of the first joints 142*a*, 142*b*, 142*c* may cooperate with the two inclined restraining surfaces 1422 of another one of the first joints 142*a*, 142*b*, 142*c* to restrain a rotation angle of the first joint 142*a*, 142*b*, 142*c* (e.g. $\theta 1+\theta 2$ shown in FIG. 4).

In this embodiment, each of the joint driving mechanisms 26*a*, 26*b*, 26*c*, 26*d* may comprise a joint motor, a coupling, a transmission shaft, an oil seal and a bearing. As shown in FIG. 7, taking the joint driving mechanism 26*d* as an example, the joint driving mechanism 26*d* may comprise a joint motor 260, a coupling 262, a transmission shaft 264, an oil seal 266 and a bearing 268, wherein the coupling 262 is connected to the joint motor 260, the transmission shaft 264 is connected to the coupling 262 and the joint reel 22*d*, and the oil seal 266 and the bearing 268 are sleeved on the transmission shaft 264. In other words, the joint reel 22*d* is connected to the joint motor 260 through the transmission shaft 264 and the coupling 262, such that joint motor 260 may drive the joint reel 22*d* to rotate. The transmission shaft 264 is covered by the oil seal 266 to provide a waterproof effect to the inside of the body 10. Furthermore, the axial center of the transmission shaft 264 may be stabilized by the bearing 268. It should be noted that the structural design of the joint driving mechanisms 26*a*, 26*b*, 26*c* may be the same as the structural design of the joint driving mechanism 26*d*, and it will not be depicted herein again.

As shown in FIG. 6, the bionic animal 1 may further comprise a neck driving mechanism 28 disposed in the body 10 and connected to the base 140 of the neck 14 (as shown in FIG. 2). The neck driving mechanism 28 may drive the base 140 to rotate to drive the head 12 to rotate through the neck 14. In this embodiment, the neck driving mechanism 28 may comprise a rotating shaft 280, a first gear 282, a second gear 284 and a neck motor 286. The first gear 282 is connected to the neck motor 286, the second gear 284 meshes with the first gear 282, and the rotating shaft 280 is connected to the second gear 284 and the base 140. Thus, when the neck motor 286 drives the first gear 282 to rotate, the first gear 282 will drive the second gear 284 and the rotating shaft 280 to rotate, so as to drive the head 12 to rotate through the neck 14. As shown in FIG. 2, the first joints 142*a*, 142*b*, 142*c* and the second joint 142*d* may rotate around a first axis A1, and the head 12 may rotate around a second axis A2, wherein the first axis A1 is perpendicular to the second axis A2. Accordingly, the head 12 and the neck 14 can flexibly perform various actions (e.g. stretching forward, leaning back, raising the head, lowering the head, shaking the neck, etc.).

In this embodiment, the buttock 16 may be pivotally connected to the body 10, such that the buttock 16 may rotate with respect to the body 10. As shown in FIGS. 2 and 6, the bionic animal 1 may further comprise a buttock reel 30, a buttock driving wire 32 and a buttock driving mechanism 34. The buttock reel 30 is disposed on the body 10. The buttock driving wire 32 is wound around the buttock reel 30 and connected to the buttock 16. In this embodiment, fixing holes may be formed on the buttock 16 to fix the buttock driving wire 32. The buttock driving mechanism 34 is disposed in the body 10 and connected to the buttock reel 30. The buttock driving mechanism 34 may drive the buttock reel 30 to rotate. When the buttock driving mechanism 34 may drive the buttock reel 30 to rotate, the buttock reel 30 will pull the buttock driving wire 32. At this time, the buttock driving wire 32 will drive the buttock 16 to rotate. For further explanation, when the buttock driving mechanism 34 drives the buttock reel 30 to rotate clockwise or counterclockwise, the buttock reel 30 may drive the buttock driving wire 32 to retract and unfold, so as to drive the buttock 16 to rotate clockwise or counterclockwise. It should be noted that the structural design of the buttock driving mechanism 34 may be the same as the structural design of the joint driving mechanism 26*d*, and it will not be depicted herein again.

As shown in FIGS. 6 and 8, the bionic animal 1 may further comprise a propeller 36 and a propeller motor 38, wherein the propeller 36 and the propeller motor 38 are disposed in the buttock 16, and the propeller 36 is connected to the propeller motor 38. Furthermore, the buttock 16 has an opening 160 and at least one slot 162, wherein the propeller 36 is exposed in the opening 160. The propeller motor 38 may drive the propeller 36 to rotate clockwise or counterclockwise. When the propeller 36 rotates in water, water flows into or out of the buttock 16 through the at least one slot 162, such that the bionic animal 1 moves forward or backward quickly.

In this embodiment, the two feet 18 may be pivotally connected to two sides of the body 10, and the two feet 18 are bent toward each other, as shown in FIG. 8. Accordingly, when the bionic animal 1 moves in water, the two feet 18 bent toward each other may make the water flow more concentrated, so as to reduce the resistance of water flow. As shown in FIG. 6, the bionic animal 1 may further comprise two foot motors 40 and the two feet 18 are respectively connected to the two foot motors 40. The foot motors 40 may drive the feet 18 to rotate clockwise or counterclockwise, such that the feet 18 swing forward or backward.

The bionic animal 1 may move forward, backward, turn, accelerate, etc. in the water through the control of the buttock 16, the feet 18 and/or the propeller 36.

As shown in FIGS. 9 and 10, the bionic animal 1 may further comprise three distance sensors 42, a charging hole 44 and a button 46, wherein the three distance sensors 42 are disposed in the body 10, and the charging hole 44 and the button 46 are disposed on the bottom of the body 10. The positions of the three distance sensors 42 correspond to front, left and right sides of the bionic animal 1 respectively, such that the three distance sensors 42 may be configured to detect obstacles in front, left and right of the bionic animal 1, thereby allowing the bionic animal 1 to avoid obstacles. The charging hole 44 is configured to charge the bionic animal 1. The interior of the button 46 may be a light emitting diode combined with a switch module, wherein the outer layer of the button 46 may be made of soft material to achieve waterproof, light-transmitting, and pressable properties.

As mentioned in the above, the invention utilizes the joint reels, the joint driving wires and the joint driving mechanisms to drive the joints to rotate in a wire driving manner, such that the head and the neck can flexibly perform various actions (e.g. stretching forward, leaning back, raising the head, lowering the head, shaking the neck, etc.). The invention may use lightweight materials to manufacture small joints, such that the joints are closely connected to each other. Furthermore, the invention may also enable the bionic animal to move forward, backward, turn, accelerate, etc. in the water through the control of the buttock, the feet and/or the propeller. Since the motors of the joint driving mechanisms and the buttock driving mechanism are disposed in a waterproof space of the body, the motors will not be affected by moisture. Moreover, the motors disposed in the body can stabilize the overall center of gravity on the lower half of the bionic animal, such that the center of gravity can remain stable when the head and the neck move, without causing the bionic animal to overturn. In an embodiment, the positions of the three distance sensors correspond to front, left and right sides of the bionic animal respectively, such that the three distance sensors may be configured to detect obstacles in front, left and right of the bionic animal, thereby allowing the bionic animal to avoid obstacles.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A bionic animal comprising:
a body;
a head;
a neck comprising a base, a plurality of first joints and a second joint, the base being disposed on the body, the plurality of first joints being pivotally connected to each other, the second joint being fixed to the head, one of the plurality of first joints being pivotally connected to the base, the second joint being pivotally connected to another one of the plurality of first joints;
a plurality of joint reels disposed on the body;
a plurality of joint driving wires wound around the plurality of joint reels and connected to the plurality of first joints and the second joint; and
a plurality of joint driving mechanisms disposed in the body and connected to the plurality of joint reels;
wherein the plurality of joint driving mechanisms drive the plurality of joint reels to rotate, the plurality of joint reels pull the plurality of joint driving wires, and the plurality of joint driving wires drive the plurality of first joints and the second joint to rotate.

2. The bionic animal of claim 1, wherein each of the plurality of first joints is triangular.

3. The bionic animal of claim 1, wherein two extending portions extend from two sides of each of the plurality of first joints, and the joint driving wire is fixed to the two extending portions.

4. The bionic animal of claim 1, wherein two sides of each of the plurality of first joints have two inclined restraining surfaces, and a bottom of one of the plurality of first joints cooperates with the two inclined restraining surfaces of another one of the plurality of first joints to restrain a rotation angle of the first joint.

5. The bionic animal of claim 1, wherein each of the plurality of joint driving mechanisms comprises a joint motor, a coupling, a transmission shaft, an oil seal and a bearing, the coupling is connected to the joint motor, the transmission shaft is connected to the coupling and the joint reel, and the oil seal and the bearing are sleeved on the transmission shaft.

6. The bionic animal of claim 1, further comprising a neck driving mechanism disposed in the body and connected to the base, wherein the neck driving mechanism drives the base to rotate to drive the head to rotate.

7. The bionic animal of claim 6, wherein the plurality of first joints and the second joint rotate around a first axis, the head rotates around a second axis, and the first axis is perpendicular to the second axis.

8. The bionic animal of claim 6, wherein the neck driving mechanism comprises a rotating shaft, a first gear, a second gear and a neck motor, the first gear is connected to the neck motor, the second gear meshes with the first gear, and the rotating shaft is connected to the second gear and the base.

9. The bionic animal of claim 1, further comprising:
a buttock pivotally connected to the body;
a buttock reel disposed on the body;
a buttock driving wire wound around the buttock reel and connected to the buttock; and
a buttock driving mechanism disposed in the body and connected to the buttock reel;
wherein the buttock driving mechanism drives the buttock reel to rotate, the buttock reel pull the buttock driving wire, and the buttock driving wire drives the buttock to rotate.

10. The bionic animal of claim 9, further comprising a propeller disposed in the buttock, wherein the buttock has an opening and at least one slot, and the propeller is exposed in the opening; wherein, when the propeller rotates in water, water flows into or out of the buttock through the at least one slot.

11. The bionic animal of claim 1, further comprising two feet pivotally connected to two sides of the body, wherein the two feet are bent toward each other.

12. The bionic animal of claim 1, further comprising three distance sensors disposed in the body, wherein positions of the three distance sensors correspond to front, left and right sides of the bionic animal respectively.

* * * * *